G. A. Watkins,
Scroll Saw.

No. 106,006.  Patented Aug. 2. 1870.

Witnesses:  Inventor

United States Patent Office.

GARDNER A. WATKINS, OF CAVENDISH, VERMONT, ASSIGNOR TO HIMSELF AND CALVIN S. GREENWOOD, OF GARDNER, MASSACHUSETTS.

Letters Patent No. 106,006, dated August 2, 1870.

IMPROVEMENT IN SAW-TABLE FOR SAWING IRREGULAR FORMS.

The Schedule referred to in these Letters Patent and making part of the same.

*To all whom it may concern:*

Be it known that I, GARDNER A. WATKINS, of Cavendish, Proctorsville Post-office, in the county of Windsor and State of Vermont, have invented a Saw-Table for Sawing Irregular Forms; and I do hereby declare that the following is a full and exact description thereof, reference being had to the accompanying drawing and to the letters of reference marked thereon making a part of this specification.

This invention relates to a new and useful improvement in sawing irregular forms, and consists in so constructing the bed-plate of jigger or band-saws, as will enable the desired form to be cut, without previous marking, or the use of pattern or templet.

In the accompanying drawing—

Figure 1:
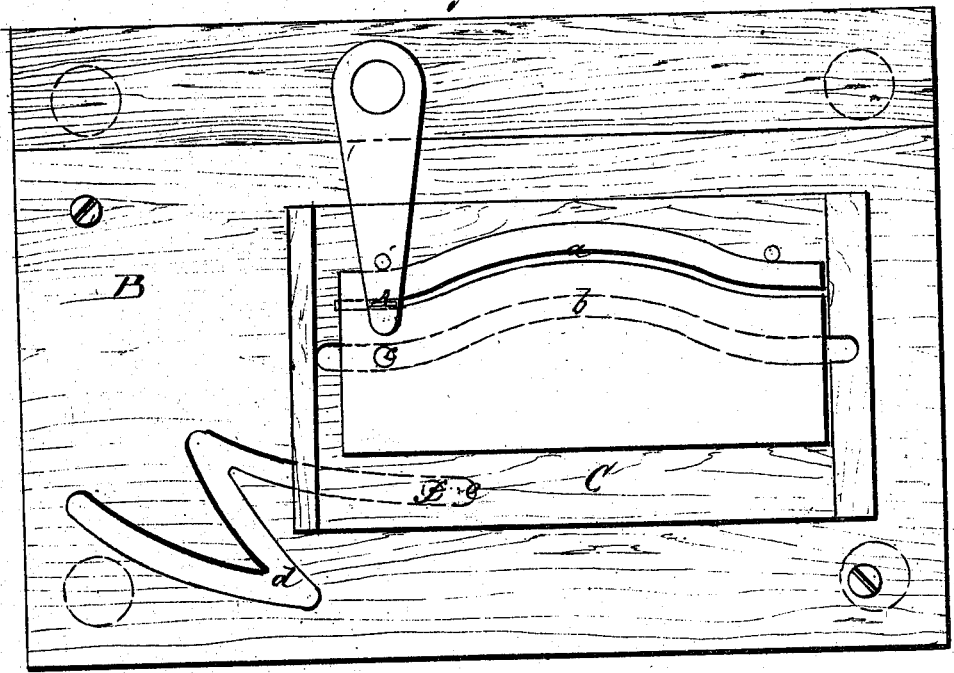

Figure 1 represents a plan or top view of my invention, and

Figure 2:
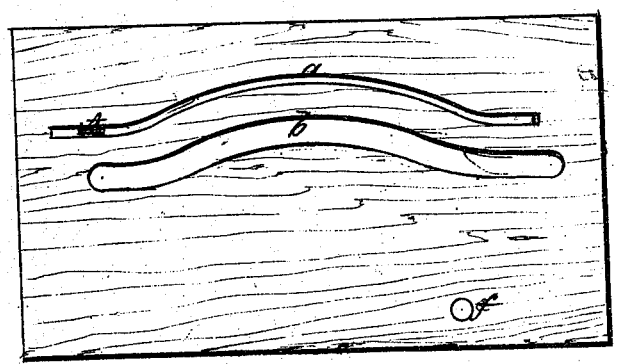

Figure 2, a view of the under side of the traveling guide-plate.

Similar letters of reference indicate corresponding parts in the drawing.

A represents a saw, of the jigger or band description, and

B, a bed-plate, through which said saw works.

C represents the traveling guide-plate.

Though the traveling guide-plate C is cut a track, $a$, of the exact curve or form which it is desired to saw, and on the under side of said traveling guide-plate C is cut a channel, $b$, being of the same form or curve, and parallel with said track $a$.

Onto the under side of the bed-plate B is fitted a guide-stud, $c$, said stud working into and being of the same diameter as the channel $b$.

Into the bed-plate B is formed an irregular channel, $d$.

The curves forming this irregular channel are described by a fixed point in the traveling guide-plate, as at $e$, (see fig. 1,) when said traveling guide-plate is moved to pass the saw through the form or scroll it is desired to cut.

Fitted to the under side of the traveling guide-plate C is a stud, $f$, of a diameter equal to the width of the channel $d$. This stud $f$ enters into the channel $d$.

Now, it will be seen that, when the traveling guide-plate C is moved in such manner as to describe the form or scroll it is desired to cut, the stud $c$ will travel through the channel $b$, and the stud $f$ will travel through the irregular channel $d$.

The traveling guide-plate C, being thus confined and limited in its movement to the direction given it by said channels, it is obvious that it cannot be moved in any other direction, and hence, when a piece of wood is placed upon said traveling guide-plate, and forced against the saw A by moving the traveling guide-plate, that the track of said saw must necessarily conform to the form or scroll for which said traveling guide-plate and channels have been constructed and arranged, and thus irregular forms or curves may be sawn or cut with extreme accuracy, without the use of pattern or templet, and without requiring previous marking or laying out, besides causing a saving in stock, for, each form being cut to the exact pattern, it is not necessary to leave any margin for subsequent dressing down to proper size, so that, in all manufactories where large quantities of irregular forms are sawn of a given pattern, as, for instance, chair manufactories, a great saving in time and expense is attained.

Having thus described my invention,

What I claim as new, and desire to secure by Letters Patent, is—

The bed B, provided with the pin $c$ and groove $d$, in combination with the movable table C, provided with the pin $f$ and groove $b$, substantially as described and for the purpose set forth.

G. A. WATKINS.

Witnesses:
HERMAN L. WATTENBERG,
G. M. PLYMPTON.